(12) United States Patent
Gossman

(10) Patent No.: US 11,467,882 B2
(45) Date of Patent: Oct. 11, 2022

(54) METHODS AND SYSTEMS FOR RAPID DEPLOYMENT OF CONFIGURABLE COMPUTING RESOURCES

(71) Applicant: Target Brands, Inc., Minneapolis, MN (US)

(72) Inventor: Mark Gossman, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 167 days.

(21) Appl. No.: 16/230,569

(22) Filed: Dec. 21, 2018

(65) Prior Publication Data

US 2020/0201682 A1 Jun. 25, 2020

(51) Int. Cl.
| | | |
|---|---|---|
| *G06F 9/455* | (2018.01) | |
| *G06F 9/46* | (2006.01) | |
| *G06F 9/50* | (2006.01) | |
| *G06F 9/48* | (2006.01) | |
| *G06F 40/205* | (2020.01) | |

(52) U.S. Cl.
CPC .......... *G06F 9/5077* (2013.01); *G06F 9/4881* (2013.01); *G06F 9/5005* (2013.01); *G06F 40/205* (2020.01)

(58) Field of Classification Search
CPC .. G06F 9/5077; G06F 9/5005; G06F 9/45558; G06F 9/4881; G06F 40/205; H04L 67/10
See application file for complete search history.

(56) References Cited

U.S. PATENT DOCUMENTS

| | | | |
|---|---|---|---|
| 6,779,031 B1* | 8/2004 | Picher-Dempsey | .... H04L 43/00 709/227 |
| 8,065,676 B1 | 11/2011 | Sahai et al. | |
| 8,095,662 B1 | 1/2012 | Lappas et al. | |
| 8,261,295 B1* | 9/2012 | Risbood | ................ G06F 9/5072 719/328 |
| 10,284,592 B1* | 5/2019 | Powers | ................... G06F 21/14 |
| 10,338,958 B1* | 7/2019 | Kamboj | ................ G06F 9/3851 |
| 10,545,779 B2* | 1/2020 | Gokurakuji | ......... H04L 67/1097 |
| 10,574,698 B1* | 2/2020 | Sharifi Mehr | ...... H04L 63/1491 |
| 10,705,945 B1* | 7/2020 | Stickle | ....................... G06F 9/50 |
| 2007/0234302 A1 | 10/2007 | Suzuki et al. | |

(Continued)

*Primary Examiner* — Emerson C Puente
*Assistant Examiner* — Zhi Chen
(74) *Attorney, Agent, or Firm* — Merchant & Gould P.C.

(57) ABSTRACT

Methods and systems for rapid deployment of virtual computing resources are described. One method includes receiving a text file defining a collection of desired virtual computing resources, the text file including a plurality of text fields defining a project name, a virtual local area network (VLAN) and a plurality of virtual servers to be provisioned within the VLAN, an IP address to be assigned, a processing capability, and a definition of disks associated with the corresponding virtual server. The method also includes executing a scheduled job to deploy a plurality of virtual computing resources according to the text file. The scheduled job parses the text file, issues commands to a provisioning interface to provision virtual computing resources, and validates provisioning of the plurality of virtual computing resources based on status messages received from the provisioning interface indicating a result of provisioning in response to each command.

15 Claims, 9 Drawing Sheets

(56) References Cited

U.S. PATENT DOCUMENTS

| | | | |
|---|---|---|---|
| 2009/0113423 A1* | 4/2009 | Hiltgen | G06F 9/45558 718/1 |
| 2009/0288084 A1* | 11/2009 | Astete | G06F 9/45558 718/1 |
| 2009/0300317 A1* | 12/2009 | Hepkin | G06F 9/5077 711/173 |
| 2010/0186010 A1* | 7/2010 | Chalemin | G06F 9/45533 718/1 |
| 2010/0306772 A1 | 12/2010 | Arnold et al. | |
| 2011/0154320 A1 | 6/2011 | Verma | |
| 2011/0238969 A1* | 9/2011 | Warkentin | G06F 9/441 713/1 |
| 2012/0198345 A1* | 8/2012 | von Eicken | H04L 67/00 715/735 |
| 2012/0311120 A1* | 12/2012 | Yasuda | H04L 41/145 709/223 |
| 2013/0054968 A1* | 2/2013 | Gupta | H04L 63/08 713/168 |
| 2014/0101178 A1* | 4/2014 | Ginter | G06F 16/90335 707/755 |
| 2014/0173350 A1* | 6/2014 | Roy | G06F 11/0706 714/37 |
| 2014/0208319 A1* | 7/2014 | Yoshimura | H04L 41/0806 718/1 |
| 2015/0113331 A1* | 4/2015 | Bhattacharya | G06F 11/3688 714/38.1 |
| 2015/0178052 A1* | 6/2015 | Gupta | H04L 67/02 717/105 |
| 2015/0358392 A1* | 12/2015 | Ramalingam | H04L 67/08 709/203 |
| 2016/0028677 A1* | 1/2016 | Narasimhan | H04W 12/0027 709/203 |
| 2016/0043968 A1* | 2/2016 | Jacob | G06F 9/5061 709/226 |
| 2016/0266917 A1* | 9/2016 | Emelyanov | G06F 9/4555 |
| 2016/0299783 A1* | 10/2016 | Combellas | H04L 67/1008 |
| 2017/0257424 A1* | 9/2017 | Neogi | H04L 43/16 |
| 2017/0351536 A1* | 12/2017 | Kamalakantha | G06F 9/54 |
| 2019/0138336 A1* | 5/2019 | Bobbitt | G06F 11/2247 |
| 2019/0171435 A1* | 6/2019 | Pande | H04L 43/10 |
| 2019/0278928 A1* | 9/2019 | Rungta | G06F 9/44505 |
| 2019/0288915 A1* | 9/2019 | Denyer | H04L 41/0813 |
| 2019/0354390 A1* | 11/2019 | Gill | H04L 41/5051 |
| 2020/0143017 A1* | 5/2020 | Yoon | G06N 3/004 |

* cited by examiner

Project Name: Example
VLAN ext-core
Availability_zone: Zone1
Network Range: 192.168.1.0/24
Image, Flavor, NA, Shared-Key, FIP, IP Address, Bootstrap Script, Node Instance, NumDisks, D1, D2, D3, D4, D5
Example-latest, gp-2cpu-2GB, NA, key, Y, 192.168.1.0, test-script, mgmt, 1, 5, 0, 0, 0, 0, 0
...

```perl
sub NodeBuild {
 if (`server list | grep $NODENAME`) {
  print "$NODENAME already exists - skipping\n";
 } else {
  print "Building $NODENAME in $AVAILABILITY_ZONE\n";
   # print "server create --image $IMAGE --flavor $FLAVOR --key-name $KEY --nic net-id=$NETID,v4-fixed-ip=$IP --user-data=$BOOTSTRAP_SCRIPT $NODENAME\n";
   `server create --image $IMAGE --flavor $FLAVOR --key-name $KEY --nic net-id=$NETID,v4-fixed-ip=$IP --user-data=$BOOTSTRAP_SCRIPT $NODENAME`;
  # Create volumes and attach.
  if ($NUMDISKS > 0){
    my $COUNTER = (8+1);
    my $SIZE;
    my $VOLNUM;
    my $DUUID;
    my $AZ_POD;
    sleep(2);
    $TMP = `server show $NODENAME | grep OS-EXT-AZ`;
    $AZ_POD = (split(/\s+/,$TMP))[3];
    while ($COUNTER <= (8+$NUMDISKS)){
     $VOLNUM = $COUNTER-8;
     $SIZE=(split(/\,/,$SERVDETAIL))[$COUNTER];
     print "Provisioning $NODENAME-vol$VOLNUM in $AZ_POD\n";
     `volume create --availability-zone $AZ_POD --description $NODENAME-vol$VOLNUM --size $SIZE $NODENAME-vol$VOLNUM`;
     $TMP=`volume list | grep $NODENAME-vol$VOLNUM`;
     if ($TMP =~ /available/){$READY = 1;}
     # Error-Trap for failed Volume create.
     while ($READY == 0){
       print "**** Provisioning of $NODENAME-vol$VOLNUM FAILED.\n";
       print "**** Deleting $NODENAME-vol$VOLNUM\n";
       `openstack volume delete $NODENAME-vol$VOLNUM`;
       sleep 1;
       print "**** Re-Provisioning $NODENAME-vol$VOLNUM\n";
       `volume create --availability-zone $AZ_POD --description $NODENAME-vol$VOLNUM --size $SIZE $NODENAME-vol$VOLNUM`;
       $TMP=`volume list | grep $NODENAME-vol$VOLNUM`;
       if ($TMP =~ /available/){$READY = 1;next;}
     }
     # End Error-Trap for failed Volume create.
     ...
} # Close NodeBuild ()
```

FIG. 7

```
$READY = 0;
#Verify Server is AVAILABLE.
$TMP = `server list | grep $NODENAME`;
if ($TMP =~ /ACTIVE/){$READY = 1;}
while ($READY == 0){
  print "Waiting for $NODENAME Provisioning to complete.\n";
  $TMP = `server list | grep $NODENAME`;
  if ($TMP =~ /ACTIVE/){$READY = 1;next;}
}
$READY = 0;
$TMP = `volume list | grep $NODENAME-vol$VOLNUM`;
$DUUID = (split(/\s+/,$TMP))[1];
print "Attaching $NODENAME-vol$VOLNUM to $NODENAME.\n";
`nova volume-attach $NODENAME $DUUID`;
$COUNTER++;
    }
  }
}
```

```
Loading Node Variables
Building Remotely on [host]
Deleting Project Workspace...
Cloning Repository
...
Building Example-network
Building Example-router
Building Example-mgmt
Provisioning Example-mgmt-vol
Attaching Example-mgmt-vol
Reserved floating-IP: 255.255.255.1
Attaching 255.255.255.1 to Example-mgmt
[Build Validation]
Response: Node Example-mgmt not found
Sleeping while server bootstraps
Response: Example-mgmt not found
Sleeping
Example-mgmt – Bootstrapped correctly
Username input: XXXXX
Password input: XXXXX
[import volume parameters]
[Establish Domain]
[Establish Tenant]
...
Finished: SUCCESS
```

METHODS AND SYSTEMS FOR RAPID DEPLOYMENT OF CONFIGURABLE COMPUTING RESOURCES

BACKGROUND

In data centers that are managed for large organizations, computing resources are often maintained as a collection of commodity devices that may be assigned to different projects or groups within the organization by deploying virtual servers on an as-needed basis. Different projects may require different types or profiles of computing resources; for example, some may require significant disk storage, while others may require significant in-memory computing capabilities, or a large number of parallel systems for high-throughput operations. When projects are completed, the computing resources that are allocated to virtual computing networks can be released back to a pool of unallocated computing systems, and reused.

Existing techniques for allocating computing resources to projects include use of a provisioning tool to provision a particular virtual server using a desired configuration. That configuration may be defined in the provisioning tool, and computing resources are allocated to the particular virtual server as it is defined by an administrative user. Such a provisioning tool may have a user interface at which a server administrator can allocate resources to a virtual network for use. This is a very time intensive process, and requires a user to manually select configuration parameters step-by-step, e.g., to select a particular network, a particular server, disk capacity, and other variables in a specific order to successfully deploy the desired solution. This process can also be very inefficient if a large number of computing resources (e.g., virtual servers) need to be provisioned.

In some cases, a heat template can be used to define a set of similar or localized virtual servers by reuse of a common heat template and configuration parameters. However, even if such a technique is used, provisioning often must be performed by an experienced server administrator, since very few organizational users may be familiar with how to read and modify the heat template and/or configuration parameters in a way that would allow them to successfully provision a sufficient number of servers for a large-scale project. Still further, these types of files are difficult to manage, since they are written in a GAML format and often will have 10,000 lines of code or more to implement a particular deployment. In any event, even for the server administrator, provisioning a large number of servers (e.g., 10 or more, and sometimes 50-100 servers depending on project scope) requires significant time and skill, as well as knowledge of the underlying physical computing infrastructure to intelligently deploy cooperating virtual servers within a common physical cluster/location. Accordingly, it is often the case that not all server administrators will have experience in provisioning of virtual servers, or may incorrectly or inefficiently deploy virtual systems.

SUMMARY

In general, the present disclosure relates to methods and systems for rapid deployment of virtual computing resources, particularly adaptable for receiving a definition of such virtual computing resources from untrained users who may have little if any knowledge of how underlying physical resources are arranged, and may not readily be able to issue all commands that would be required to successfully set up virtual computing resources for a particular project. Accordingly, a scheduled parser job can receive a text file defining basic information about a virtual computing resource to be defined (e.g., a VLAN) and can intelligently parse the virtual system requirements included in that text file and automate issuance of commands to a virtual server deployment environment.

In a first aspect, a method of deploying virtual computing resources within a computing network including a plurality of computing resources available for allocation is disclosed. The method includes receiving a text file defining a collection of desired virtual computing resources, the text file including a plurality of text fields defining a project name, a virtual local area network (VLAN) and a plurality of virtual servers to be provisioned within the VLAN, each of the plurality of virtual servers having an identifier, an IP address to be assigned, a processing capability, and a definition of one or more disks associated with the corresponding virtual server. The method further includes, within a virtual server deployment environment, executing a scheduled job to deploy a plurality of virtual computing resources according to the text file and based on a configuration of physical resources available for allocation, the scheduled job comprising a script that parses the text file, issues commands to a provisioning interface to provision virtual computing resources, and validates provisioning of the plurality of virtual computing resources based on status messages received from the provisioning interface indicating a result of provisioning in response to each command. Issuance of one or more of the commands is conditional based on receipt of a status message indicating a successful result of provisioning in response to a previous command.

In a second aspect, a system includes a server system hosting a job scheduler and a parser job. When executed in response to initiation by the job scheduler, the parser job parses a text file and issues commands to a virtual server deployment environment, the text file including a plurality of text fields defining a project name, a virtual local area network (VLAN) and a plurality of virtual servers to be provisioned within the VLAN, each of the plurality of virtual servers having an identifier, an IP address to be assigned, a processing capability, and a definition of one or more disks associated with the corresponding virtual server, the text file lacking information regarding physical or logical arrangement of the physical resources available for allocation. The parser job issues commands to a provisioning interface of a virtualization manager associated with a virtual server deployment environment according to the text file and validates provisioning of the plurality of virtual computing resources based on status messages received from the provisioning interface indicating a result of provisioning in response to each command. Issuance of one or more of the commands is conditional based on receipt of a status message indicating a successful result of provisioning in response to a previous command.

In a third aspect, a method of deploying virtual computing resources within a computing network including a plurality of computing resources available for allocation dispersed across a plurality of clusters is disclosed. The method includes receiving a text file defining a collection of desired virtual computing resources, the text file including a plurality of text fields defining a project name, a virtual local area network (VLAN) and a plurality of virtual servers to be provisioned within the VLAN, each of the plurality of virtual servers having an identifier, an IP address to be assigned, a processing capability, and a definition of one or more disks associated with the corresponding virtual server, the text file lacking at least information regarding the plurality of clusters associated with the physical resources available for allocation. The method further includes, within a virtual server deployment environment, executing a scheduled job to deploy a plurality of virtual computing resources according to the text file and based on a configuration of physical resources available for allocation, the scheduled job comprising a script that parses the text file, issues commands to a provisioning interface to provision virtual computing resources, and validates provisioning of the plurality of virtual computing resources based on status messages received from the provisioning interface indicating a result of provisioning in response to each command. The physical resources available for allocation are dispersed across a plurality of clusters, and allocation of the plurality of virtual computing resources is performed to maintain the VLAN within a single cluster of the plurality of clusters, and the text file lacks at least information regarding the plurality of clusters associated with the physical resources available for allocation.

BRIEF DESCRIPTION OF THE DRAWINGS

FIG. 7 is a portion of an example parser job executed from a scheduler to parse the example text file and issue server deployment commands to a virtual server deployment environment, according to an example embodiment.

FIG. 8 is a further portion of an example parser job executed from a scheduler to parse the example text file and issue server deployment commands to a virtual server deployment environment, according to an example embodiment.

FIG. 9 illustrates example output messages generated by the scheduled parser job once executed to provide a status of virtual server deployment, according to an example embodiment.

DETAILED DESCRIPTION

As briefly described above, embodiments of the present invention are directed to methods and systems for rapid deployment of virtual computing resources, particularly adaptable for receiving a definition of such virtual computing resources from untrained users who may have little if any knowledge of how underlying physical resources are arranged, and may not readily be able to issue all commands that would be required to successfully set up virtual computing resources for a particular project. Accordingly, a scheduled parser job can receive a text file defining basic information about a virtual computing resource to be defined (e.g., a VLAN) and can intelligently parse the virtual system requirements included in that text file and automate issuance of commands to a virtual server deployment environment.

The methods and systems described herein provide a number of advantages regarding usability of virtual server deployment environments. For example, use of a simple text file can allow untrained users to deploy virtual computing environments, without any foreknowledge of underlying physical resources, while allocating the underlying physical resources in an intelligent way (e.g., without creating a VLAN across separate underlying physical clusters). Furthermore, because the parser job can quickly issue deployment commands to the virtual server deployment environment, the parser job is embedded with numerous validation checks, which act to both synchronize the parser job with the speed of deployment of the virtual server deployment environment and to provide further the validation of correct deployment. Additionally, use of a parser job to deploy a specific VLAN as part of a project simplifies redeployment activities, and allows for intelligent re-allocation of previously provisioned resources through replication of all or portions of a text file for use with the parser job.

Figure 1:
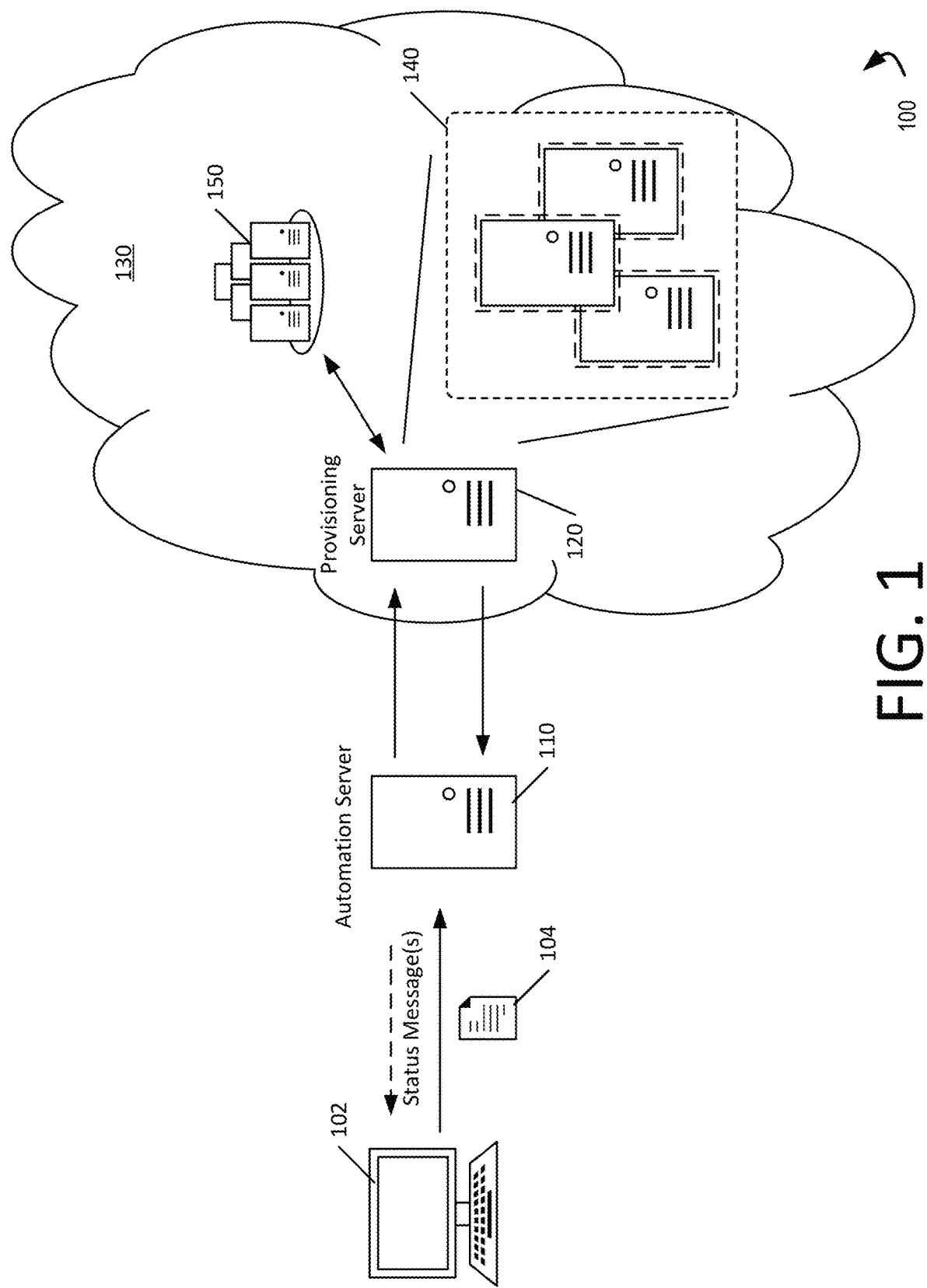
FIG. 1 illustrates a computing resource deployment environment in which aspects of the present disclosure can be implemented.

Referring now to FIG. 1, an environment 100 is shown in which aspects of the present disclosure can be implemented. In the embodiment shown, a user computing device 102 can provide a text file 104 to an automation server 110. The automation server can store the text file, and in response to execution of a scheduler, issue requests to a provisioning server 120. The provisioning server 120 is interfaced to a cloud computing environment 130. The cloud computing environment 130 includes a plurality of unallocated physical resources 140, such as routers, switches, server computing systems, disk volumes, and other computing equipment. In example embodiments, the unallocated physical resources may be located in many different locations, such as organized into different clusters or positioned in different data centers.

In the example embodiment shown, the provisioning server 120 can allocate selected physical resources from the unallocated physical resources 140 for inclusion in a virtualized environment. For example, the provisioning server 120 can define a virtual local area network (VLAN) 150 that includes a plurality of network servers capable of executing a specific computing task. In doing so, the provisioning server 120 issues specific allocation commands to identifying and allocate various computing resources to the VLAN. In one particular example, the provisioning server 120 will first allocate a router and define a virtual segment in which the router resides. The provisioning server 120 will subsequently allocate switches, servers, and other computing resources accessible via the router. The provisioning server 120 will then allocate one or more storage volumes to each server associated with the VLAN.

As the provisioning server 120 issues provisioning commands to form virtualized computing networks, the provisioning server will return status messages to the automation server 110, which will relay those status messages to the user computing device 102. Optionally, the automation server 110 will store the status messages and provide them upon request by the user computing device 102 (e.g., in an instance in which the automation server 110 initiates provisioning at a time when the user computing device 102 is not in use).

Figure 2:
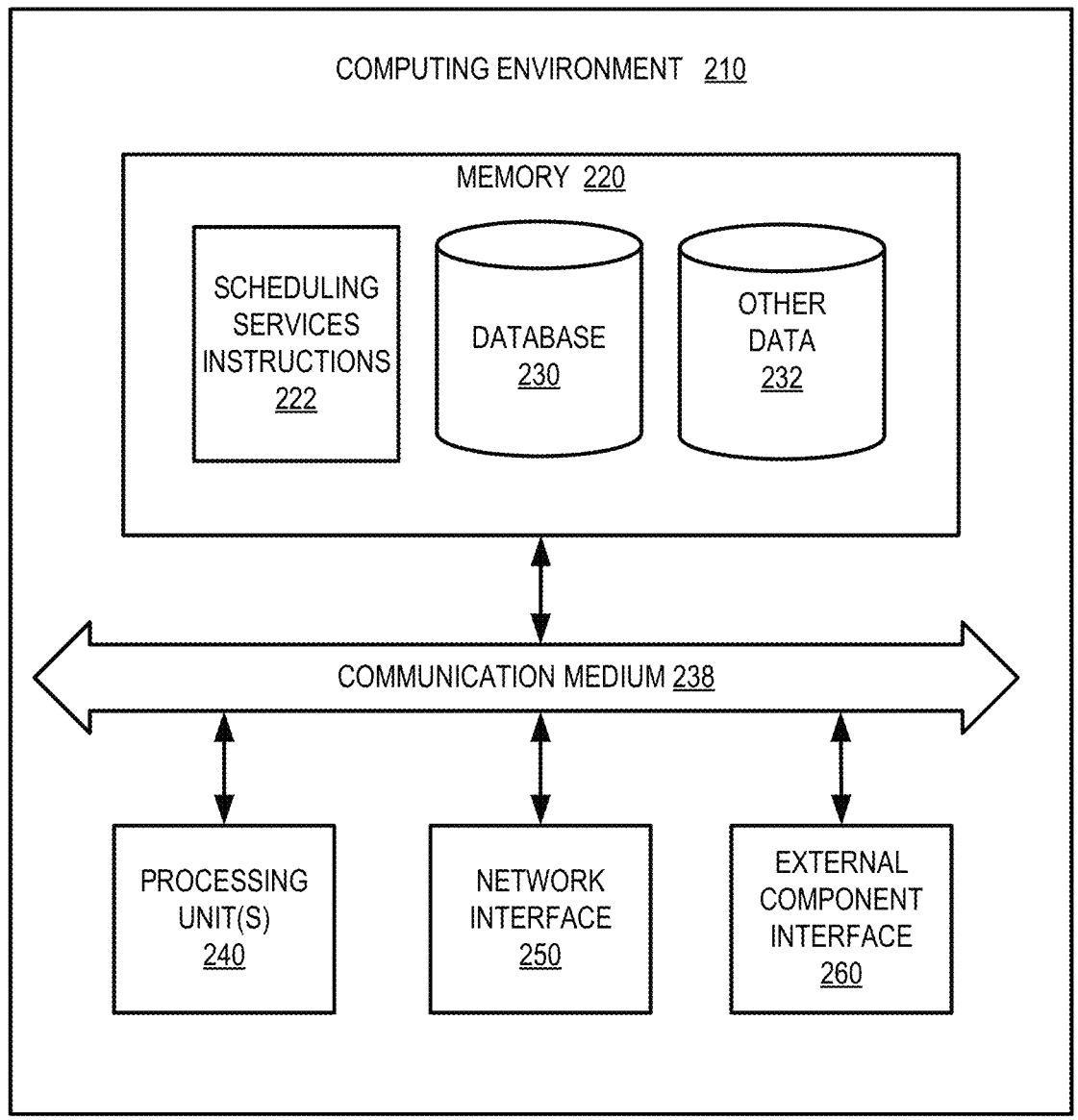
FIG. 2 illustrates an example computing environment in which aspects of the present disclosure can be implemented.

FIG. 2 illustrates an example system 200 with which disclosed systems and methods can be used. In an example, the system 200 can include a computing environment 210. The computing environment 210 can be a physical computing environment, a virtualized computing environment, or a combination thereof. The computing environment 210 can include memory 220, a communication medium 238, one or more processing units 240, a network interface 250, and an external component interface 260.

The memory 220 can include a computer readable storage medium. The computer storage medium can be a device or article of manufacture that stores data and/or computer-executable instructions. The memory 220 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

The memory 220 can store various types of data and software. For example, as illustrated, the memory 220 includes synchronization instructions 222 for implementing one or more aspects of the data synchronization services described herein, database 230, as well as other data 232. In some examples the memory 220 can include instructions for managing storage of provisioning files, such as text files, logs of provisioning results, etc.

The communication medium 238 can facilitate communication among the components of the computing environment 210. In an example, the communication medium 238 can facilitate communication among the memory 220, the one or more processing units 240, the network interface 250, and the external component interface 260. The communications medium 238 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 240 can include physical or virtual units that selectively execute software instructions. In an example, the one or more processing units 240 can be physical products comprising one or more integrated circuits. The one or more processing units 240 can be implemented as one or more processing cores. In another example, one or more processing units 240 are implemented as one or more separate microprocessors. In yet another example embodiment, the one or more processing units 240 can include an application-specific integrated circuit (ASIC) that provides specific functionality. In yet another example, the one or more processing units 240 provide specific functionality by using an ASIC and by executing computer-executable instructions.

The network interface 250 enables the computing environment 210 to send and receive data from a communication network (e.g., network 140). The network interface 250 can be implemented as an Ethernet interface, a token-ring network interface, a fiber optic network interface, a wireless network interface (e.g., WI-FI), or another type of network interface.

The external component interface 260 enables the computing environment 210 to communicate with external devices. For example, the external component interface 260 can be a USB interface, Thunderbolt interface, a Lightning interface, a serial port interface, a parallel port interface, a PS/2 interface, and/or another type of interface that enables the computing environment 210 to communicate with external devices. In various embodiments, the external component interface 260 enables the computing environment 210 to communicate with various external components, such as external storage devices, input devices, speakers, modems, media player docks, other computing devices, scanners, digital cameras, and fingerprint readers.

Although illustrated as being components of a single computing environment 210, the components of the computing environment 210 can be spread across multiple computing environments 210. For example, unless otherwise noted herein, one or more of instructions or data stored on the memory 220 may be stored partially or entirely in a separate computing environment 210 that is accessed over a network.

Figure 3:
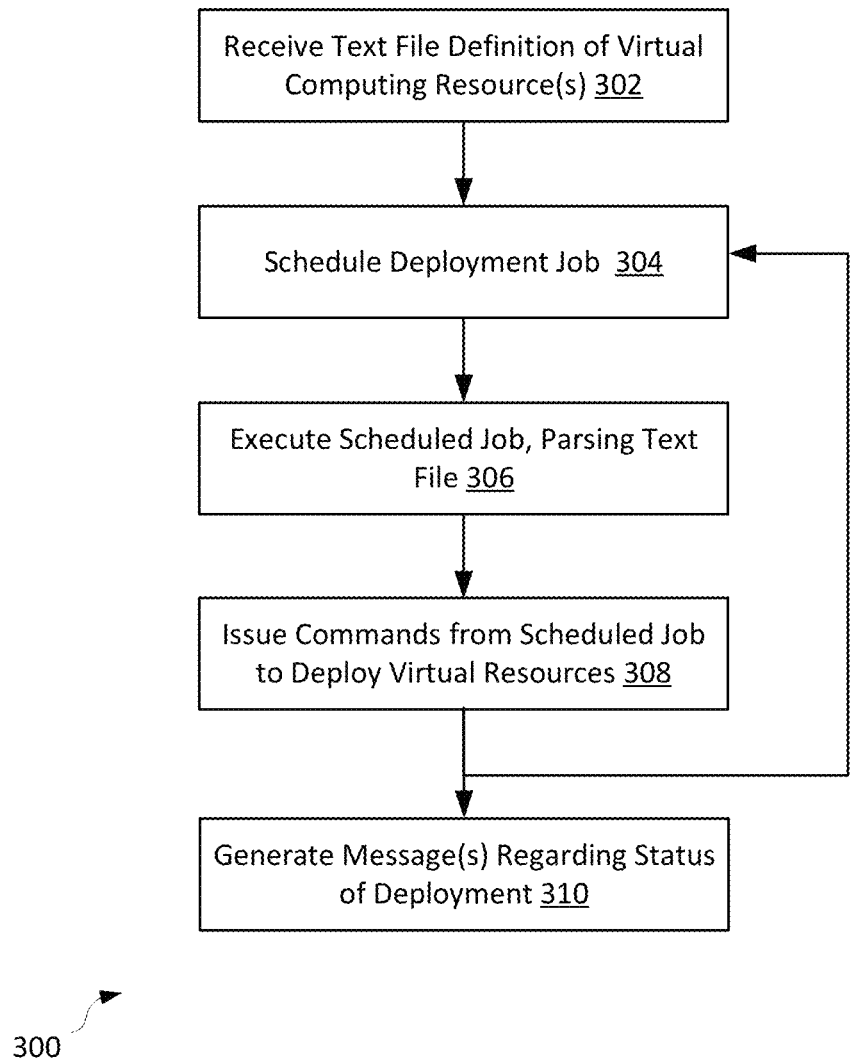
FIG. 3 illustrates an example method of deploying virtual computing resources within a virtual server deployment environment, according to an example embodiment.

Referring now to FIG. 3, a flowchart of a method 300 of deploying virtual computing resources within a virtual server deployment environment is depicted. The method 300 can be performed within the data management computing system 100 of FIG. 1, using computing systems such as described in connection with FIG. 2.

In the embodiment shown, the method 300 includes receiving a text file that defines virtual computing resources to be allocated to a particular project (step 302). In general, the text file will include only information defining the virtual computing resources to be allocated, and will not include information associated with the underlying physical resources used to form the virtual computing environment.

The method 300 further includes scheduling a deployment job (step 304) which will be executed at a predetermined time. In example embodiments, the deployment job can be scheduled within an automation server, such as a Jenkins installation. At the predetermined time, the scheduled job can be executed (step 306). The scheduled job can include execution of a parser which parses a script program. The script program can be configurable to access and read the text file. In response to the contents of the text file, the parsing of the script program can result in issuance of command line instructions that result in commands that are transmitted to a provisioning server for deployment of virtual resources (step 308). In addition, while commands are issued to deploy virtual resources, one or more messages regarding status of deployment can be generated (step 310). The messages can include, for example, command line messages in response to the provisioning instructions that are issued to cause deployment of the virtual resources.

Figure 4:
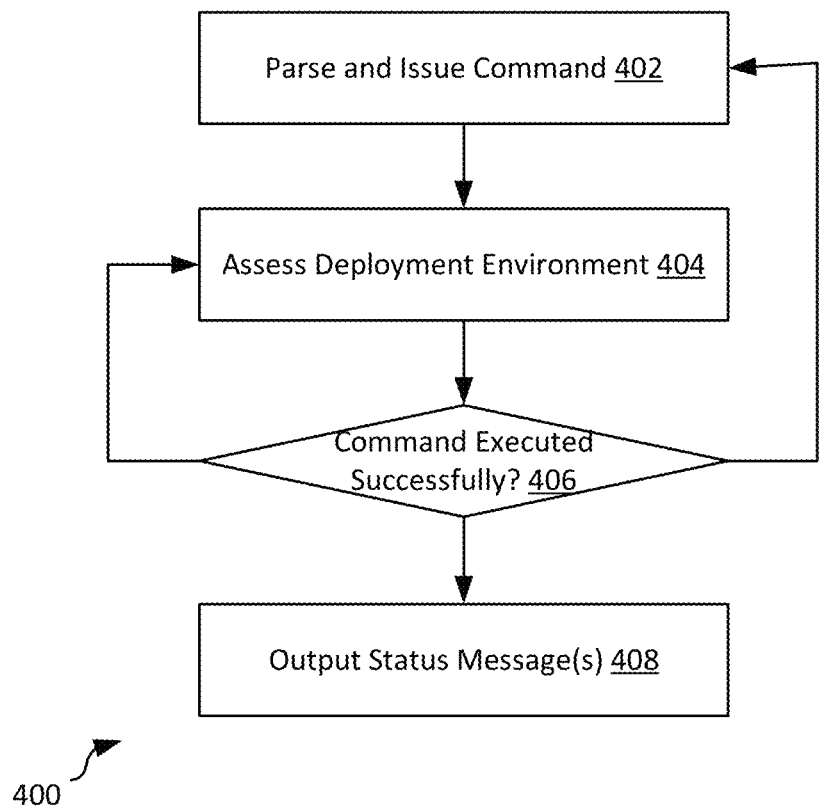
FIG. 4 illustrates an example parsing job operational sequence useable to assist in deploying virtual computing resources, according to aspects of the present disclosure.

Referring now to FIG. 4, in example method 400 is illustrated which is executed by a parsing job to assist in deploying virtual computing resources. The method includes, in one embodiment, parsing a script program and issuing a command to a virtualization manager which is associated with a virtual server deployment environment (step 402). The method of 400 further includes assessing the deployment environment to determine whether the command was successful (step 404). For example, the command may either execute unsuccessfully (as determined at operation 406), or may require additional time for processing (e.g., in case the virtualization manager needs to identify a volume local to a server that has previously been allocated or reconfigure servers and/or clusters to ensure efficient allocation of underlying physical resources).

If the command did not execute successfully, the method 400 can include waiting and re-assessing the deployment environment for a predetermined period of time to determine whether additional time is required for successful deployment. After a predetermined amount of time has passed, the method can include generating a status message (at step 408) and proceeding to parse and issue subsequent commands (returning to step 402) if the subsequent commands can be issued even in view of failure of the previous command. If the command did execute successfully, the method 400 can include simply proceeding to parse and issue subsequent commands. In this instance, output status messages can also be generated, to communicate successful execution of those provisioning commands. Examples of status messages are provided below in connection with FIG. 9.

Figure 5:
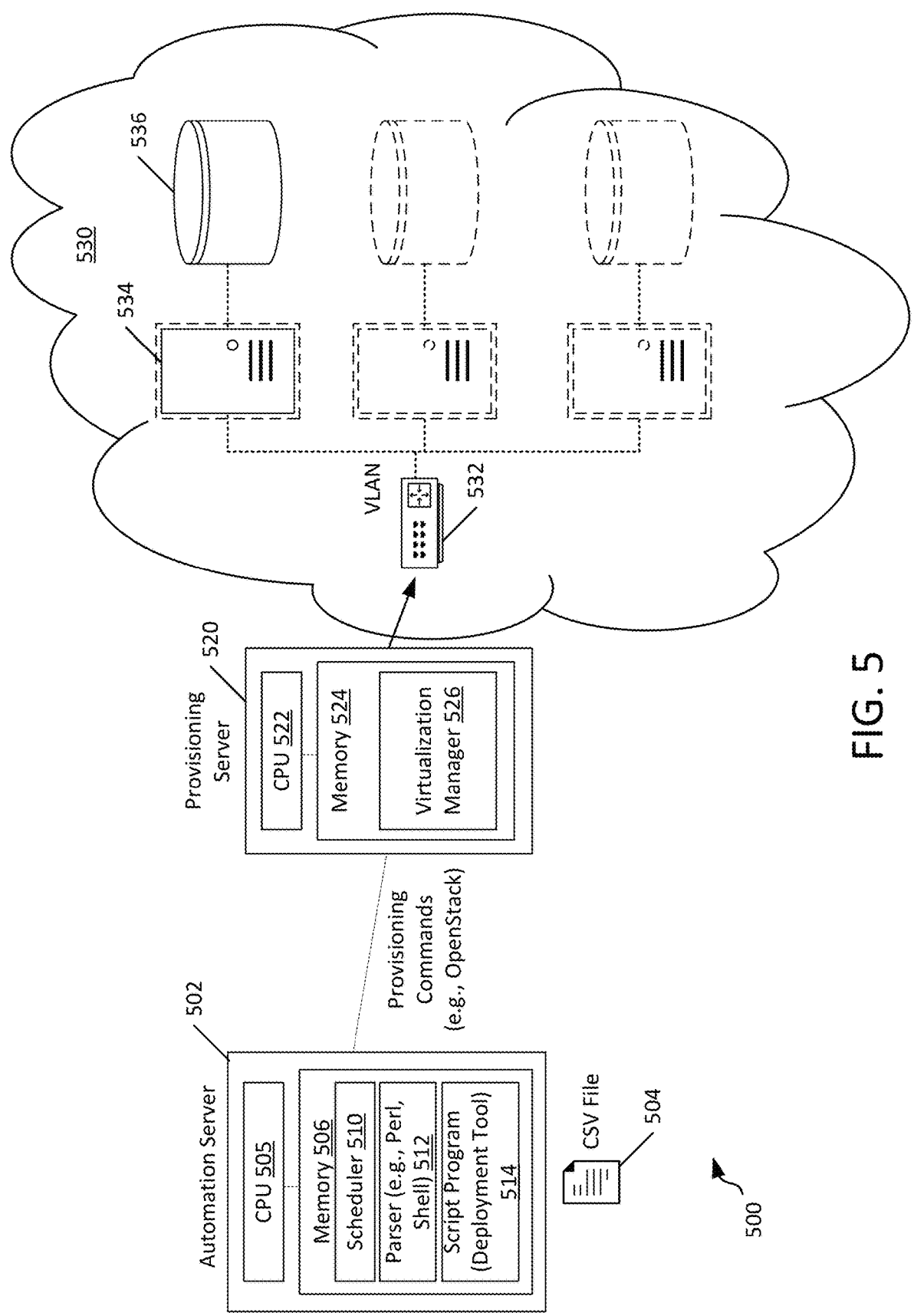
FIG. 5 illustrates a computing resource deployment example according to aspects of the present disclosure.

FIG. 5 illustrates a computing resource deployment platform 500 according to aspects of the present disclosure. The computing resource deployment platform 500 can a performed, for example, using the system the system described above in connection with FIG. 1.

In the example shown, a text file 504 (e.g., a comma separated value (CSV) file) can be received at an automation server 502. Details regarding an example text file are provided below in connection with FIG. 6. Generally, the text file 504 will include a definition of virtual computing resources to be provisioned, including a definition of a virtual local area network, and server node and start volumes to the included within such a network.

The text file 504 will typically not include details regarding underlying physical resources that will be used in provisioning the virtual local area network and virtualized resources. Rather, a particular parser job (e.g., deployment tool) will be used to translate the request for virtualized resources into a set of provisioning commands with efficiently allocate the physical resources to provisioned virtual local area networks. For example, a deployment tool will specifically control provisioning such that a virtual local area network is provisioned from physical resources within a common physical resource cluster, The automation server 502 can include a processor 505 communicatively connected to a memory 506. The automation server 502 can be implemented using any of a variety of computing systems, such as those described home in connection with FIG. 2. The memory 506 stores instructions which, when executed, provide a scheduler 510 that can be configured to execute a parser 512 which parses a particular parser job 514. The scheduler 510 can be, in some embodiment, a Jenkins scheduler, while the parser 512 can be any of a number of programs configured to parse a parser job (e.g., a script program) to execute commands. In one example, the parser comprises a perl execution environment, and the parser job is a perl script configured to read the text file and generate provisioning commands to be issued to a provisioning server 520. However, other types of scheduling and parsing applications could be used as well.

In the embodiment shown, the provisioning server 520 also includes a processor 522 communicatively connected to a memory 524. The provisioning server 520 can be implemented using any of a variety of computing systems, such as those described home in connection with FIG. 2.

In the example shown, the provisioning server 520 hosts a virtualization manager 526, which manages provisioning of virtual computing resources within an enterprise cloud computing environment, by managing provisioning and de-allocation of virtual computing resources for use on-demand. The virtualization manager 526 manages allocation of underlying physical resources according to requests for virtual computing resources. In an example embodiment, the virtualization manager 526 can be implemented using OpenStack cloud computing management software, an open source software product available at www.openstack.org. Other cloud computing management software or enterprise virtualization software could be used as well.

The provisioning server 520 can be accessed and requests issued from the automation server (e.g., from the parser job 514) via an Application Programming Interface (API) exposed by the provisioning server. In one example, the API can be implemented as the OpenStack API. For example, the automation server 502 can act as a command line client relative to the provisioning server 520, and issue command line provisioning commands to an OpenStack instance at the provisioning server (where the OpenStack instance corresponds to the virtualization manager 526). However, other interfaces can be used as well.

In the example shown, the virtualization manager 526 provisions a cloud 530 to form a virtual local area network (VLAN) supported by underlying physical computing resource. The VLAN will generally be formed by provisioning computing resources in a particular order, e.g., first a virtual router 532, and subsequently designating IP addresses accessible via the router. Nodes 534 can then be defined and assigned IP addresses and various capabilities (as further outlined below) in conjunction with one or more storage volumes 536.

Figure 6:
FIG. 6 illustrates a portion of an example text file useable to initiate an executed job used to deploy a virtual server environment.

FIG. 6 illustrates a portion of an example text file 600 useable to initiate an executed job used to deploy a virtual server environment. The example text file 600 can represent, for example, a portion of a text file useable within the context of the virtual computing resource deployment system 500 described above in conjunction with FIG. 5.

As seen in the example text file 600, a new virtual environment deployment will include a project name, a definition of a virtual local area network (VLAN), an availability zone (e.g., a region into which a particular deployment is intended), and a range of IP addresses to be assigned to computing resources within the virtual local area network. Additionally, for each node included in the virtual local area network, a set of parameters is included. The set of parameters, in the embodiment shown, include an image file defining the operating system image to be applied to the computing resource, a computing capability (e.g., a particular CPU type or capacity), a shared key, IP address parameters including the one or more IP addresses to be assigned to the node, a bootstrap script name, a node instance, a number of storage volumes to be allocated to the node, and, for each storage volume, a storage capacity.

Notably, the text file 600 only requires inclusion of information defining the virtual local area network to be allocated, and does not require inclusion of details regarding an underlying physical computing resource set from which the virtual computing environment is created. Accordingly, the scheduled job described above will include, among other operations, determinations that ensure efficient allocation of resources (e.g., allocating server resources within a common cluster to a single VLAN, allocating disk volumes local to a server for use by the server, etc.).

Referring to FIGS. 5-6, it is noted that, in some circumstances, the automation server 502 may issue commands to the provisioning server 520 to cause re-provisioning or re-allocation of a VLAN, e.g., within a new project. This may occur if a subsequent provisioning might use similar project parameters, but within a different project name. In such circumstances, there may be multiple separate instances of a similar VLAN provisioned within the cloud 530. This may be useful in the event that a particular VLAN requires restoration or recovery (e.g., in the event of an error occurring in one or more nodes of one of the VLANs). In such circumstances, the parser job 514 may include code that ensures that volumes that were provisioned in existing VLANs (e.g., attached to different nodes) can be reused or replicated within a newly-provisioned VLAN. For example, in some cases, two text files having two different project names may utilize a common name and common characteristics for a node and/or a storage volume (e.g., similar capacity, etc.). In such circumstances, the two projects will generate two different VLANs, but since the node itself may be formed using a common image and storage volume, the contents of the storage volume in the existing VLAN may be configurd to be replicated into the newly-provisioned VLAN. In this way, the methods and systems described herein can provide quick recovery from use of a common name across project instances may indicate that a common storage volume, including any persisted information stored within that volume, may be migrated or duplicated across projects.

FIG. 7 is a portion of an example parser job 700 executed from a scheduler to parse the example text file and issue server deployment commands to a virtual server deployment environment, according to an example embodiment. In the example shown the parser job is executed using the perl programming language; however in alternative embodiments other programming languages could be used as well. As seen in the parser job 700, a node building subroutine includes an assessment whether a node previously exists prior to attempting to allocate the node. If the node previously exists, the parser job will output a message indicating that the node was previously built. If the node does not previously exist, if the parser java 700 will output a message indicating the node is being built in a particular availability zone, and will issue a command to the virtualization manager to allocate and provision a virtual server node with a particular set of parameters defined from the text file. A message indicating a successful creation of the virtual server node can then be output as well. Once the server node is created, one or more disks volumes can also be allocated and attached to the server node.

In addition, a series of disk allocation commands can be performed to allocate and attach the disk storage to the server node. For each disk to the allocated, if allocation is successful a message indicating that the volume was created will be generated by the parser job. However if allocation or provisioning is not successful, the node will be deleted and provisioning can be attempted again. Messages indicating the additional attempt to provision the volume will be generated and returned, e.g., for storage in a log or display on a user device.

Referring now to FIG. 8, still further example aspects of a portion of a parser job 800 are illustrated. The parser job portion 800 can be executed, for example, after parser job 700, and as part of node and volume allocation within a virtual local area network. In the example shown, the parser job can operate to attach provisioned disks to a previously allocated node. For example, a message can be displayed indicating that a node is in process of being provisioned. Once the node is successfully provisioned and ready for disks to have attached, the parser job can list and attach the volumes to the node.

Notably, the portions of parser job 700, 800 as shown represents only a portion of an overall provisioning sequence performed by a parser job. Other tasks, e.g., creation of a virtual local area network, provisioning of a router, or other provisioning operations can be included as well, and typically will be included in a parser job. The portions 700, 800 as shown is therefore only intended to be exemplary. However, it is noted that certain features of the parser jobs are illustrated in the portions shown in FIGS. 7-8. In particular, the parser job is illustrated to perform both provisioning and assess tasks that ensure proper provisioning of a virtual local area network and knows within such a virtual local area network. This is accomplished without inclusion of details regarding the underlying physical resources used to allocate the computing resources for the virtual local area network in the text file that defines the requested virtual resources.

Still further, the parser job 700 controls timing of provisioning; because typically provisioning is performed manually, provisioning is performed at a pace faster than a user inputs provision commands. However because parser job rapidly issues provisioning commands, one or more tests to determine whether provisioning has happened successfully are included, and conditional statements are also included to either retry provisioning or accommodate circumstances in which a particular provision command may not execute successfully or may not execute in adequate time before a subsequent provisioning command has issued.

FIG. 9 illustrates a display 900 that presents example output messages generated by the scheduled parser job. The example output messages can be generated and logged by the parser job when executed by the scheduler, and can be viewed by a user to determine a status of virtual server deployment, according to an example embodiment.

In the example shown, a series of messages are displayed in a sequence based on the provisioning status executed by the parser job and based on the information in the text file. For example, a sequence of messages as shown includes messages indicating provisioning of a network, a router, and management volumes used for a virtual local area network. Allocation of IP addresses to the network is also performed and associated messages displayed. Once the network is established, one or more messages may be displayed relating to validation of the network provisioning. Subsequently, initiation of a server may occur, with messages relating to waiting for bootstrapping of a server generated by the parser job. A username and password may be provided (e.g., from the text file) and domain and tenant information established. Once the virtual local area network has been established, one or more nodes and associated volumes are provisioned and added to the network with IP addresses, capabilities, and storage volume capacities assigned. The messages may include an overall completion status message such as a success or fail message.

Referring to FIGS. 1-9 generally, it is noted that there are a number of advantages over existing systems provided by the above methodology for rapidly deploying virtual computing resources. For example, a user wishing to deploy virtual computing resources may not have detailed knowledge of provisioning commands that may be required to accomplish that task. That user may know that he/she needs a particular set of servers and may want them to have specific software installed thereon (and be accessible at particular IP addresses), the user may not be able to define commands that could provision such virtual servers to accomplish that task. The methods and systems described herein allow such an untrained user to use an automated tool that can receive his or her system requirements in the form of an easily understandable text file (i.e., which requires no special software or programming knowledge).

Still further, the methods and systems described herein remove a requirement for a user to have knowledge of underlying physical computing resources, and in particular knowledge regarding the layout or capabilities of such underlying resources. Since underlying resources may be arranged into clusters, and may have specific numbers of disks associated with each physical server system, the systems described herein intelligently allocate storage volumes to virtual server nodes based on physical proximity of storage volumes to the processor that will be associated with that node, to avoid a circumstance where large latency is introduced by physically/geographically dispersed servers and storage.

Additionally, the methods and systems described herein reduce the amount of time required for a user to provision virtual computing resources. While typical heat map templates or provisioning command interfaces require a large number of lines of code or commands to accomplish provisioning even a basic VLAN, using the present systems, such a user need only enter information into a text file defining, e.g., VLAN, node, and storage volume parameters. This is a significantly smaller amount of information than is typically included in such a heat map or complete set of provisioning commands, and as such, time to define a VLAN by a user, even if that use is experienced in provisioning virtual resources, is vastly reduced.

Furthermore, the methods and systems of the present disclosure provide additional benefits in the context of reconfiguration or recovery of computing resources. Since multiple projects can be instantiated by executing scheduled parser jobs associated with different text files, multiple VLANs can quickly be created. Where one VLAN may have a node that has failed (either in provisioning or during execution), another VLAN project can rapidly be provisioned and deployed, with specific resources (e.g., storage volumes) replicated across volumes based on use of a common name and/or configuration parameters.

Finally, even where provisioning can be automated, in typical circumstances such provisioning must be supervised by a trained user. This is because provisioning of servers or disks may rail or take variable amounts of time to occur, and might require some type of change to configuration or a repeated provisioning attempt. The systems and methods of the present disclosure provide validation of provisioning steps throughout the provisioning process, while including changes to configurations in the event errors have occurred (e.g., by attempting to provision a different node or volume entirely in the event of a failure).

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method of deploying virtual computing resources within a computing network including a plurality of computing resources available for allocation, the method comprising:
   receiving a text file comprising a comma separated value (CSV) file, the text file defining a new virtual environment deployment of a plurality of computing resources, the text file having a plurality of text fields including a project name, a definition of a virtual local area network (VLAN) having a plurality of nodes, an availability zone defining a region into which the new virtual environment deployment is intended, and,
   for each node, the text file having a set of parameters that include an image file defining an operating system to be applied to the plurality of computing resources, a computing capability, a number of storage volumes to be allocated for the node, and,
   for each storage volume, the text file having a storage capacity, the text file being defined irrespective of underlying availability of physical computing resources; and
   within a virtual server deployment environment, executing a scheduled job to deploy the plurality of virtual computing resources according to the text file and a configuration of physical resources available for allocation, the scheduled job including a script executed via a parser to:
      generate and issue a set of commands, the set of commands comprising:
         provisioning commands issued to a provisioning server to provision the plurality of virtual computing resources as defined in the text file;
         validation commands;
         status output messaging commands including a plurality of status output messages displayable to a user and representative of current execution states of each of the provisioning commands and validation commands; and validate, according to one or more of the validation commands, provisioning of the plurality of virtual computing resources based on one or more status output messages received from the provisioning server indicating a result of provisioning in response to each provisioning command, wherein generation and issuance of one or more of the provisioning commands are conditional based on receipt of a status output message of the one or more status output messages indicating a successful result of provisioning in response to a previous provisioning command.

2. The method of claim 1, further comprising generating the text file within a user interface accessible to a server administrator.

3. The method of claim 1, wherein the text file describes requested computing resources without defining at least some selection criteria for the physical resources to be allocated toward the provisioned virtual computing resources.

4. The method of claim 3, wherein the selection criteria excluded from the text file includes at least a location of a storage volume and a location of a processing system to be allocated for use by the provisioned virtual computing resources.

5. The method of claim 1, wherein the virtual server deployment environment includes an automation server communicatively connected to the provisioning server, the provisioning server having access to physical resources available for allocation.

6. The method of claim 1, wherein executing the scheduled job comprises triggering, within an automated job scheduler, execution of a deployment tool by the parser to deploy virtual computing resources based on the text file.

7. The method of claim 6, wherein the deployment tool includes one or more conditional statements which, based on the status output messages received from the provisioning interface, perform one or more operations in response to assessment of whether a previous deployment operation of a different virtual computing device was performed successfully.

8. The method of claim 7, wherein the physical resources available for allocation are dispersed across a plurality of clusters, and allocation of the plurality of virtual computing resources is performed to maintain the VLAN within a single cluster of the plurality of clusters.

9. The method of claim 8, wherein the text file lacks at least information regarding the plurality of clusters associated with the physical resources available for allocation.

10. The method of claim 1, wherein the physical resources available for allocation are dispersed across a plurality of computing systems, and allocation of the plurality of virtual computing resources includes allocation of a plurality of storage volumes within a single computing system.

11. The method of claim 10, wherein the text file lacks at least information regarding the plurality of storage volumes associated with each of the plurality of computing systems included in the physical resources available for allocation.

12. The method of claim 10, wherein the plurality of storage volumes includes at least one storage volume having a common name with a preexisting storage volume, and wherein the at least one storage volume is provisioned as a duplicate of the preexisting storage volume.

13. The method of claim 10, further comprising deploying a workload to the plurality of virtual computing resources for execution.

14. The method of claim 1, wherein the computing capability comprises a particular CPU type.

15. The method of claim 1, wherein the computing capability comprises a capacity.

\* \* \* \* \*